United States Patent [19]

Cash et al.

[11] Patent Number: 5,481,312

[45] Date of Patent: Jan. 2, 1996

[54] METHOD OF AND APPARATUS FOR THE TRANSMISSION OF HIGH AND LOW PRIORITY SEGMENTS OF A VIDEO BITSTREAM OVER PACKET NETWORKS

[75] Inventors: Glenn L. Cash, Matawan; Mehmet R. Civanlar, Red Bank, both of N.J.

[73] Assignee: AT&T Corp., Murray Hill, N.J.

[21] Appl. No.: 342,404

[22] Filed: Nov. 18, 1994

Related U.S. Application Data

[63] Continuation-in-part of Ser. No. 304,339, Sep. 12, 1994, abandoned.

[51] Int. Cl.$^6$ ............................................. H04N 7/12
[52] U.S. Cl. .................... 348/466; 348/437; 348/438; 348/465
[58] Field of Search ..................... 348/465, 466, 348/467, 390, 397, 415, 416, 419, 437, 471, 438; 370/85.6, 112, 84, 118; H04N 7/12

[56] References Cited

U.S. PATENT DOCUMENTS

| | | | |
|---|---|---|---|
| 5,144,425 | 9/1992 | Joseph | 348/419 |
| 5,202,886 | 4/1993 | Rossi et al. | 370/84 X |
| 5,231,486 | 7/1993 | Acampora et al. | 348/469 |
| 5,361,097 | 11/1994 | Kolczynski | 348/390 |
| 5,363,141 | 11/1994 | Faryar | 348/471 |
| 5,386,232 | 1/1995 | Golin | 348/467 |

*Primary Examiner*—Victor R. Kostak
*Attorney, Agent, or Firm*—John A. Caccuro

[57] ABSTRACT

Apparatus and method of transmitting a video bitstream from a transmitter over a facility to a receiver, the video bitstream including a plurality of high priority segments and associated low priority segments, is disclosed. The transmitter first transmits high priority information, representative of the high priority segments, of the video bitstream over the facility using a first packet delivery mechanism having a first probability of success and subsequently transmits a low priority partition, including the low priority segments, of the video bitstream over the facility using a second packet deliver mechanism having a second probability of success which is substantially lower than that of the first delivery mechanism. At the receiver, the high priority partition is received and used to generate the high priority segments. When each low priority segment of the low priority partition is received, the associated high priority segment is interleaved in real time with the received low priority segment to create an interleaved video bitstream. The high priority information may be sent as a high priority partition (including the high priority segments), sent as a high priority format (used by the receiver to generate high priority segments), or sent as a high priority identifier (used to identify previously stored high priority segments at the receiver).

28 Claims, 6 Drawing Sheets

TABLE 7-28

| PRIORITY_BREAK POINT | SYNTAX ELEMENTS INCLUDED IN PARTITION ZERO |
|---|---|
| 0 | THIS VALUE IS RESERVED FOR PARTITION 1. ALL SLICES IN PARTITION 1 SHALL HAVE A PRIORITY_BREAKPOINT EQUAL TO 0 |
| 1 | ALL DATA AT THE SEQUENCE, GOP, PICTURE AND SLICE() DOWN TO EXTRA_BIT_SLICE IN SLICE(). |
| 2 | ALL DATA INCLUDED ABOVE, PLUS MACROBLOCK SYNTAX ELEMENTS UP TO AND INCLUDING MACROBLOCK_ADDRESS_INCREMENT. |
| 3 | ALL DATA INCLUDED ABOVE, PLUS MACROBLOCK SYNTAX ELEMENTS UP TO AND INCLUDING CODED_BLOCK_PATTERN(). |
| 4 ... 63 | RESERVED |
| 64 | ALL SYNTAX ELEMENTS UP TO AND INCLUDING CODED_BLOCK_PATTERN() OR DC COEFFICIENT (dct_dc_differential), AND THE FIRST(RUN,LEVEL) DCT COEFFICIENT PAIR(OR EOB). |
| 65 | ALL SYNTAX ELEMENTS ABOVE, PLUS UP TO 2 (RUN LEVEL) DCT COEFFICIENT PAIRS. |
| ... | |
| 63+j | ALL SYNTAX ELEMENTS ABOVE, PLUS UP TO j (RUN LEVEL) DCT COEFFICIENT PAIRS. |
| ... | |
| 127 | ALL SYNTAX ELEMENTS ABOVE, PLUS UP TO 64 (RUN LEVEL) DCT COEFFICIENT PAIRS. |

FIG. 6

METHOD OF AND APPARATUS FOR THE TRANSMISSION OF HIGH AND LOW PRIORITY SEGMENTS OF A VIDEO BITSTREAM OVER PACKET NETWORKS

This application is a continuation-in-part of application Ser. No. 08/304,339, filed on Sep. 12, 1994 now abandoned.

Related subject matter is disclosed in the following application filed concurrently herewith and assigned to the same assignee hereof: U.S. patent application Ser. No. 08/341787, pending, entitled "Method Of And Apparatus For Video Bitstream Transmission Over Packet Networks," inventors G. L. Cash and M. R. Civanlar.

TECHNICAL FIELD

This invention relates to video transmission and, more particularly, to a technique for transmitting compressed previously stored video over lossy packet networks in real time so as to reduce the effects of packet losses on the quality of the received video.

BACKGROUND OF THE INVENTION

Transmission of stored compressed video over lossy packet networks has a number of important applications including movies-on-demand, interactive television, and corporate educational video distribution. Most of the present and planned packet networks, particularly Asynchronous Transfer Mode (ATM) networks, exhibit packet loss. Since compression reduces redundancy in the video signal, losing random parts of a compressed video bit-stream may cause drastic reduction in the quality of the received video. It is a continuing problem to improve the quality of video transmission over such packet networks.

SUMMARY OF THE INVENTION

The present invention discloses apparatus and method of transmitting a video bitstream from a transmitter over a packet network to a receiver, the video bitstream including a plurality of high priority segments (high priority pertition) and low priority segments (low priority pertitions). The high priority segments contain vital control information such as the codes that define the start of pictures and picture header information. The low priority segments contain the rest of the bitstream. As an example, the high priority and low priority segments may be determined in accordance with the well-known MPEG-2 draft standard (see Generic Coding of Moving Pictures and Associated Audio, Recommendation H.262, ISO/IEC 13818-2, March 1994). In the present invention, the high priority information, representative of the high priority segments, is sent first over the network using a guaranteed delivery mechanism of the network; thereafter the low priority partition is sent in real time over the network using a non-guaranteed delivery mechanism. At a receiver location, the high priority information is received and used to generate the high priority segments. When the low priority partition is received at the receiver location, its segments are interleaved with each generated high priority segment, in real time to recreate the video bitstream.

The high priority information may be sent as a high priority partition, sent as a high priority format used by the receiver to generate a high priority partition, or sent as a high priority identifier used to identify a high priority partition previously stored at the receiver.

DETAILED DESCRIPTION

Figure 1:
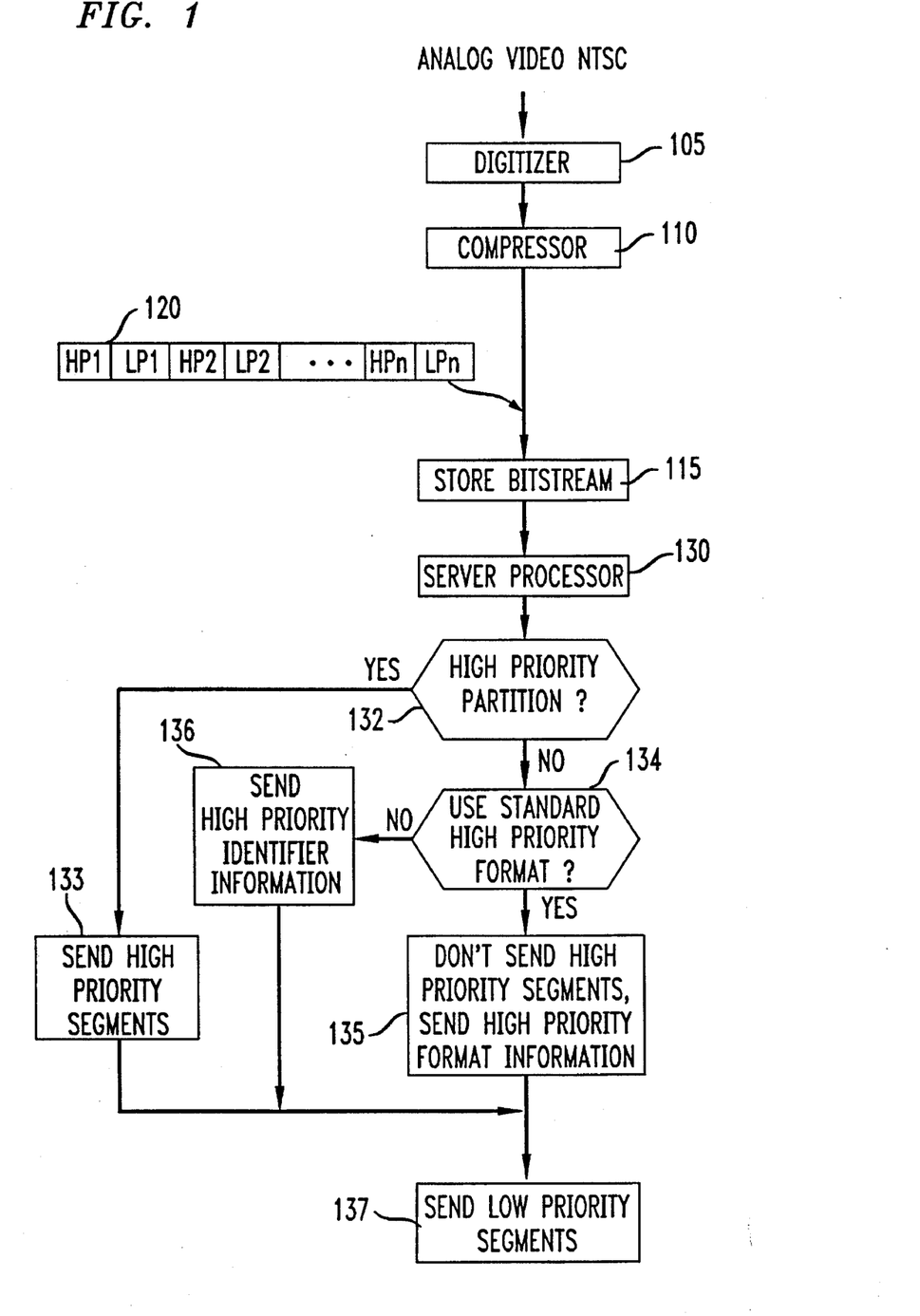
FIG. 1 shows our inventive method for the transmission of high and low priority segments.

With reference to FIG. 1, we describe how the present invention is used for the transmitting of high and low priority portions of video information over a packet network. Analog video signals associated with each video program (or video segment) are received in the standard NTSC, PAL, etc., formats, digitized in digitizer 105, compressed in compressor 110 and the resulting compressed video bitstream is stored in a disc 115. Illustratively, the well-known format of a video bitstream of a video segment is shown by 120. As shown, the illustrative video bitstream data for a video segment includes a plurality of high priority (e.g., HP1) and low priority (e.g., LP1) segments. In an encoded bitstream, the partition boundaries (e.g., that between HP1 and LP1) cannot be determined without some processing. This "data partitioning" is described in the above-identified MPEG-2 standard as a technique that splits a video bitstream into two layers called partitions. A priority breakpoint indicates which syntax elements are placed in partition 0, which is the base partition (also called high priority partition). The remainder of the bitstream is placed in partition 1 (which is also called low priority partition). The interpretation of "priority_breakpoint" is given in Table 7–28 on page 113 of the MPEG-2 standard, which is reproduced herein as FIG. 5.

In the prior art, when a request for a video segment is received, the video bitstream 120 is obtained from storage 115 and processed by a priority transmitter unit (not shown in FIG. 1) so that the high priority video partition (e.g., segments HP1–HPn) is sent over a high priority channel of a transmission facility and the low priority partition (e.g., segments LP1–LPn) is sent over a low priority channel of the facility. In such an arrangement, the high priority channel is typically one having a high probability of delivery, while the low priority channel is one having a substantially lower probability of delivery. Undesirably, facilities which connect to a packet network may only have channels which operate at one error rate. In such an arrangement, the prior art techniques may not be as useful.

In accordance with the present invention, server processor 130 determines if the high priority information sent to the clients should be sent using the high priority segments themselves (steps 132, 133), sent using a high priority format (steps 132, 134, 135), or sent using a high priority identifier (steps 132, 134, 136) which identifies a previously stored high priority partition at the client or receiver location. In one example, when the high priority information is to be sent as the high priority segments themselves (step 133), server processor 130 of the stored bitstream 115 generates the high priority partition (311 of FIG. 3) and the low priority partition (312 of FIG. 3). In such a case, the server sends the high priority partition followed by the low priority partition segments (step 137) to the client location. As noted, the server may also send the high priority information in the form of a high priority format (step 135, see FIG. 6) or a high priority identifier (step 136) followed by the low priority partition (step 137) to the client location.

Figure 2:
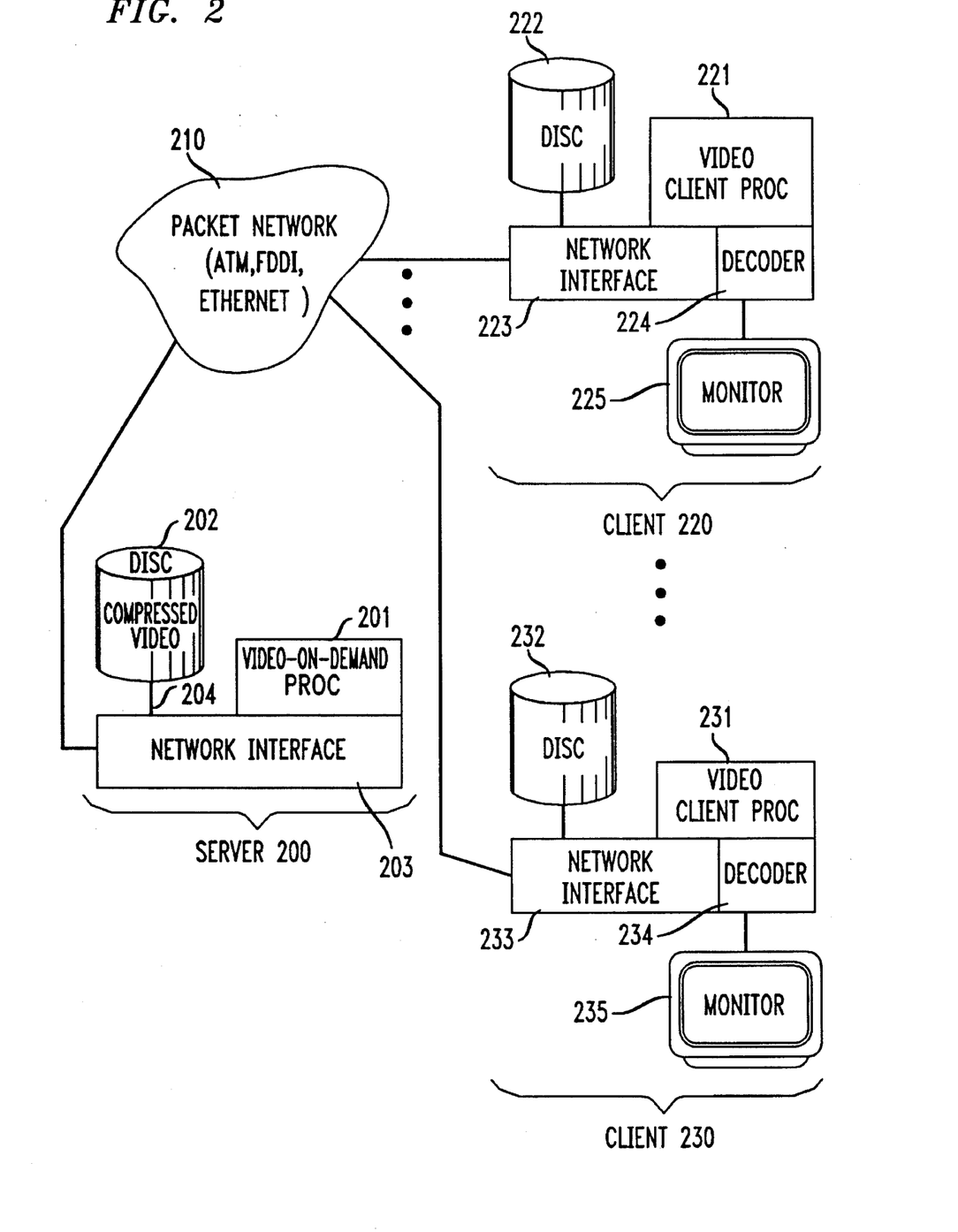
FIG. 2 shows our illustrative client server video distribution network useful in understanding the present invention.

With reference to FIG. 2, we describe an illustrative server/client network in which the present invention may be utilized. Such a network includes a server location 200 which connects via packet network 210 to a plurality of clients 220-230. Server location 200 includes a video-on-demand server/processor 201 which controls the operation of the hard disc 202 and network interface 203. The hard disc 202 is used to store the compressed video bitstreams utilizing one or more of the formats shown in FIG. 3. It should be noted that all of the compressed video data stream need not be stored locally on disc 202, but may be remotely stored, as part of a remote file server, and accessible via facility 204 (e.g., a local area network).

The network interface 203 is utilized to transmit and receive using the protocols required by the packet network 210. The processor 201 performs the functions illustrated at the server portion of the flowchart of FIG. 4.

The packet network 210 may be an Asynchronous Transfer Mode (ATM) network, an FDDI, Ethernet or other similar packet networks.

A client location, e.g., 220, includes a network interface 223 for converting communication protocols received from and transmitted over a facility connected to packet network 210. A disc 222 is used to store the high priority portion of the video bitstream received by network interface 223. The video client processor 221 processes the received video bitstream in accordance with the client functions illustrated in the flowchart of FIG. 4. Processor 221 interleaves the high priority data received from disc 222 with the low priority data received by network interface 223 and then sends the interleaved data to decoder 224. The output of decoder 224 is the requested video segment which is then displayed on the client monitor 225.

Similarly, client 230 includes processor 231, disc 232, network interface 233, decoder 234 and monitor 235.

Figure 3:
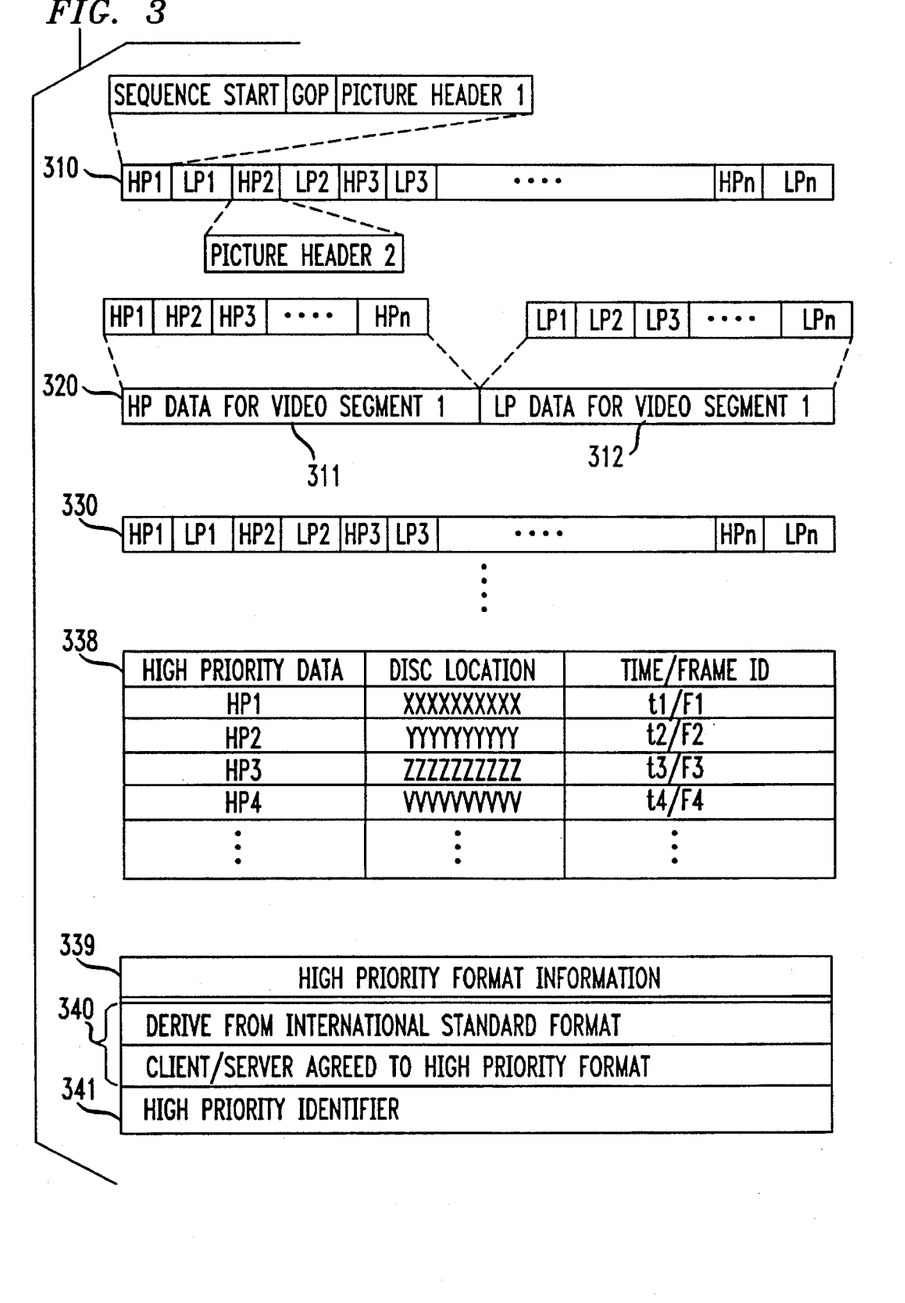
FIG. 3 shows various formats for storing video bitstreams in a disc at the server location.

With reference to FIG. 3, we describe the various formats for storing video bitstreams representing data of video segments 1 through n.

Figure 5:
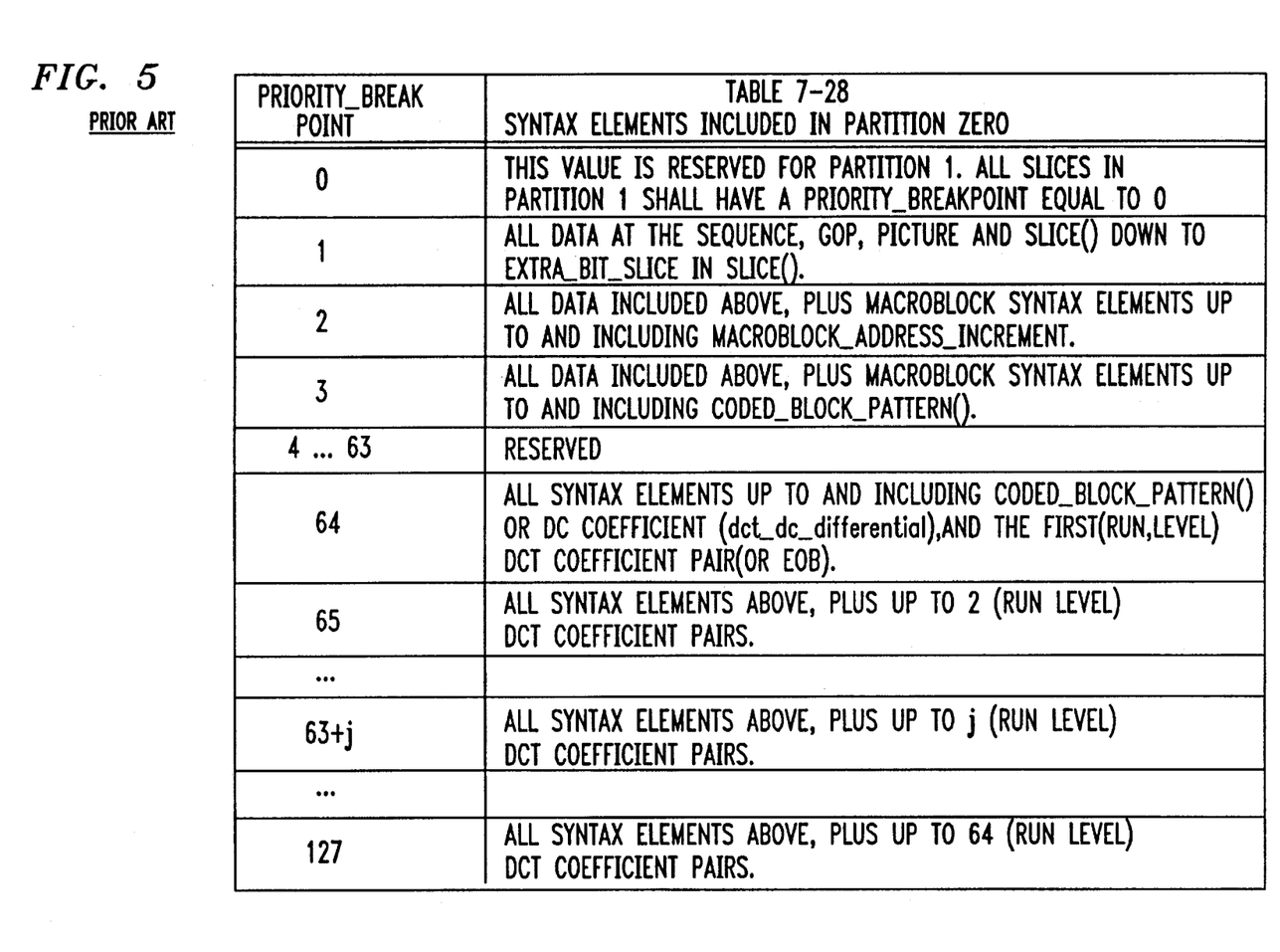
FIG. 5 shows Table 7–28 of the MPEG-2 draft standard illustrating priority break points.

Shown by 310 is the raw compressed data stream for video segments 1–n, where the high priority and low priority portions are HP1–HPn and LP1–LPn, respectively. In the raw compressed data stream, the separation between the high priority (e.g., HP1) and low priority (e.g., LP1) data portion can be defined based on priority breakpoints. These priority breakpoints can have a variety of values as shown in FIG. 5 which illustrates Table 7–28 of the previously referenced MPEG-2 standard. In accordance with the present invention, the network server can be arranged to handle any of the breakpoint values shown in Table 7–28 (FIG. 5). When data is stored as a raw compressed data stream, the network server 200 must first identify the video segment requested by a client and then process the data stream associated with that requested segment using the particular breakpoint value to identify the high priority data segments. It should be noted that the division between the high priority and low priority partitions varies with the particular video segment and the type of priority breakpoint (see Table 7–28 of FIG. 5) utilized for partitioning. Illustratively, in one embodiment the high priority data portion HP1 includes those data items of priority breakpoint 1 shown in Table 7–28 of FIG. 5.

Generally, any of the priority breakpoints of FIG. 5 can be sent as part of the high priority partition (133 of FIG. 1). However, only priority breakpoints 0-1 would be used if a high priority format (135 of FIG. 1) or high priority identifier (136 of FIG. 1) is used as the high priority information sent to the client.

Hence, with reference to FIG. 3, HP1 would include sequence start, GOP and picture header 1. The picture header also includes a time or frame identifier. The sequence start header includes data defining the vertical and horizontal resolution of the video segment. A video segment includes multiple pictures (or frames). The picture (or frame) rate may be from 24 per second for motion pictures to 30 per second for broadcast television. Each picture (or frame) may include a plurality of slices. The GOP data is optional, and includes the picture coding utilized for the segment. The picture header 1 includes the header information for all slices of picture 1 (or frame 1). The low priority data portion LP 1 includes the rest of the bitstream for picture 1. Additionally, in accordance with the present invention, the low priority data portion LPI may include time and frame identifiers corresponding to that of HP1. Similarly, each of the high priority data portions HP2 through HPn include at least the headers for the slices of the associated picture. The length of each video segment may be different and have a different number of high priority and low priority data portions within each segment. Note that the size of the low priority data portions LP1–LPn may be different lengths due to picture content.

After identifying these high priority data portions HP1–HPn, network server 200 then forms the high priority and low priority data segments shown, respectively, by 311 and 312. Shown by 320, the data for video segment 1 has been processed into a high priority data partition 311 and a low priority data partition 312 and stored on disc 202. This processing of the data may be done by server 200 or the data may be received in processed form by server 200 and downloaded to disc 202. Similarly, the data associated with video segments 2 through n have also been stored after having been partitioned into high priority and low priority data portions. When the data or video segments 1–n are stored using the format 320, then the network server 200 need only transmit the high and low priority partitions of the requested segment to the client without further processing. Thereafter, the server 200 outputs the requested video segment to the client in the format shown by 320.

Shown in 330 is another format for storing video segment bitstreams. This format uses the raw compressed data streams of 310 together with a table 338 which preferably identifies the disc location and time stamp or frame identification for each high priority data portion of each video segment. Alternatively, the length of the high and low priority data portions or perhaps a time stamp or frame identification for each high priority data portion may also be stored in the table 338. Using the format shown in 330, server 200 can quickly form the high priority data segment 311 and low priority segment 312 using the table entries to quickly locate the high priority data portions HP1–HPn stored on disc 202. Consequently, server 200 can process a requested video segment by a client in real time and output a data stream of the requested video segment to the client in the format shown by 310.

Alternatively, server 200 can send high priority information using high priority format 340 or high priority identifier 341. This high priority information is used by the receiver to generate a high priority partition—that is, in our example shown in Table 338, either an international standard, if one exists, or a format previously agreed-to by the client and server 200.

Another implementation may use a high priority identifier to identify which of several previously stored high priority partitions available at the client receiver is to be interleaved with the low priority partition to reconstruct the original video bitstream. In such an embodiment, the high priority information sent to the client would include either the appropriate high priority format or identifier information.

Figure 6:
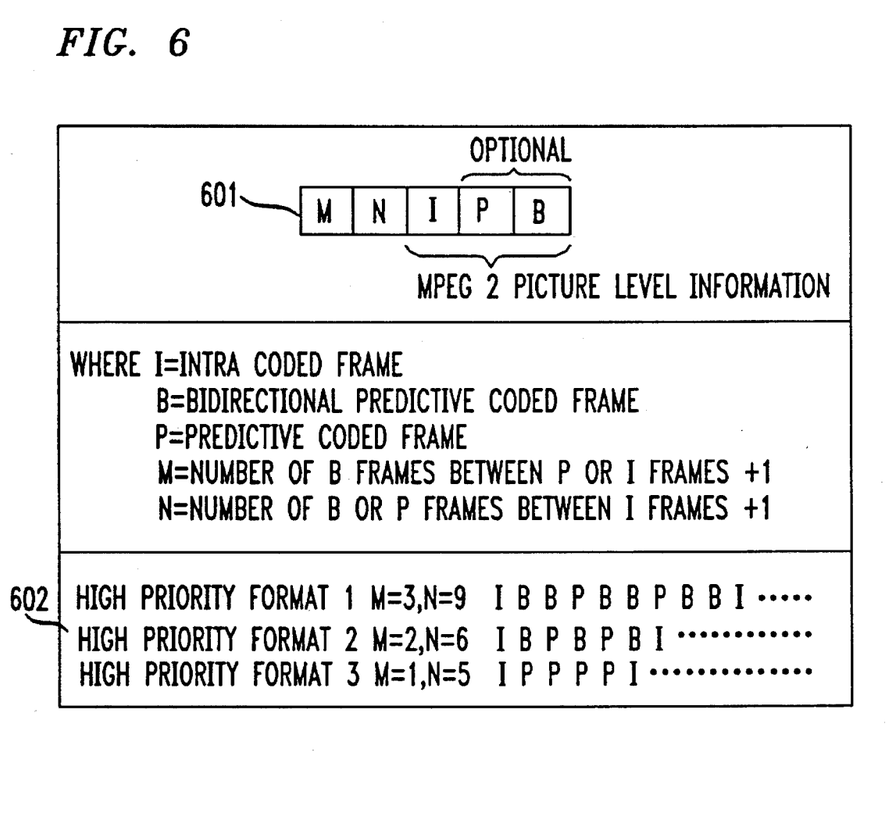
FIG. 6 shows examples of high priority formats.

With reference to FIG. 6, we illustrate an example of a high priority standard format which may be sent from the server 200 to the client. As shown by 601, the format includes an M and N number and MPEG-2 picture level information. As shown, the MPEG-2 picture level information includes an I and, optionally, a P and/or B frame. As shown, the M specifies the number of B frames between P or I frames+1 and N specifies the number of B or P frames between I frames+1, where I is the intra-coded frame, B is the bidirectional coded frame, and P is the predictive coded frame. Shown in 602 are several examples of different M and N values for high priority formats 1, 2 and 3.

Figure 4:
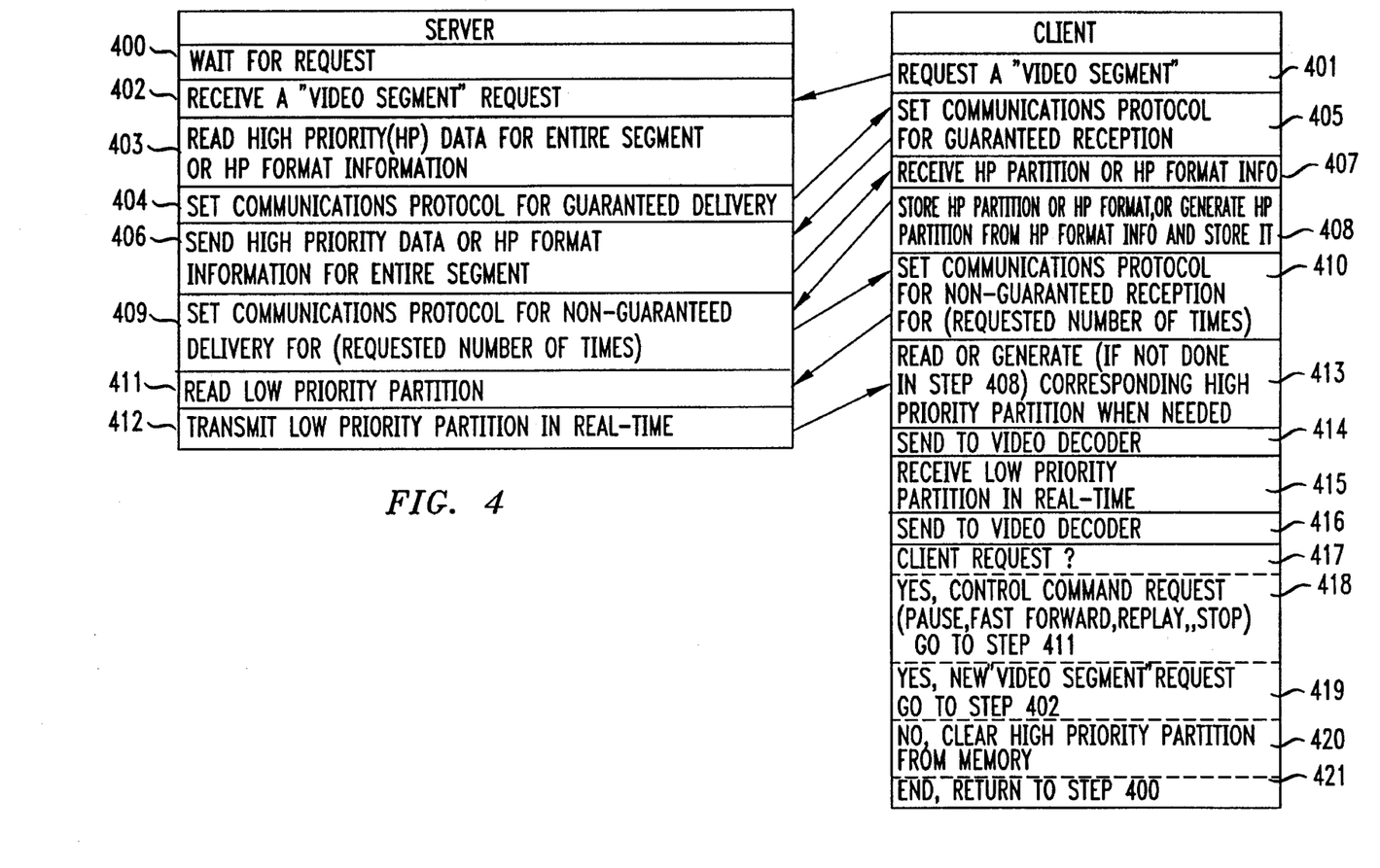
FIG. 4 is a flowchart describing the server and client interactions for handling video segment requests.

With joint reference to FIGS. 2, 3 and the flowchart of FIG. 4, we describe the server and client interaction for handling video segment requests from a client.

In step 400, server 200 is in a wait state, waiting for a client request. In step 401, a client 220 requests a particular video segment. In step 402, network server 200 receives a client's video segment request. In step 403, server 200 reads the high priority format or reads the high priority identifies for the entire requested segment. Thus, for example, if the data for a video segment was stored in the format 320, then server 200 need only read out the high priority segment 311 from disc 202. However, as previously described, if data for the requested video segment was stored, or received from a remote file server, in its raw compressed data form, server 200 must process that data to create the high priority data segment 311 from the individual high priority data items HP1 through HPn of 310 of FIG. 3. Even though a video segment is received in its raw compressed data form, it may still be sent to the client in real time. For example, the desired video segment may be broken into multiple sub-segments, each with its own high priority 311 and low priority 312 partitions. Server 200 may then provide an elastic first-in-first-out buffer (p/o processor 201) to store at least one sub-segment. The transmission of the first sub-segment is delayed by at least one sub-segment's time period, so that server 200 can set up the HP partition 311 and LP partition 312 for the first sub-segment. Thereafter, while the first sub-segment is being transmitted to the client, the next sub-segment is being received and processed by server 200. In this manner, the HP and LP partitions 311 and 312 can be formed and transmitted to the client in real time from the received raw compressed data stream.

Alternatively, if data for the requested video segment was previously stored in disc 202 in the format 330, then server 200 would utilize table 338 to identify in real time the high priority data partition in the data stream of the requested video segment. Using either 1) the high priority data of the requested video partition 311 stored in disc 202, or 2) the processed raw compressed data stream which is formatted into the high priority data partition 311 or 3) by using table 338 together with the raw compressed data stream to generate the high priority data partition 311 in real time, server 200 prepares the high priority data for the requested video segment for transmission to the requesting client. Alternatively, as previously noted the server 200 can send information in the form of the high priority data itself, high priority format information, or a high priority identifier, depending on the implementation of the client/server network. In step 404, server 200 selects a packet network 210 communication protocol which ensures guaranteed delivery of the high priority information over the packet network 210 to the requesting client. The communication protocol for guaranteed delivery would, of course, be one that is specified by packet network 210. Such communication protocols for guaranteed delivery are well known in the art. For example, see "Reliable Stream Transport Service (TCP), Chapter 12 of the book by D. E. Comer entitled *Internetworking with TCP/IP*, Volume 1:Principles, Protocols and Architecture, Second Edition, Prentice Hall, 1991. Typically, such a communication protocol for guaranteed delivery involves the sending of data packets with error detection and, possibly, error correction capability to the client. The client would then, typically, after receiving the packet send an acknowledgement message back to the server 200. This acknowledgement message would indicate to server 200 whether client 220 has received the packet with errors or error-free. This acknowledgement message can also be used to alert the server 200 when an out-of-sequence data packet has been received by client 220. If no acknowledgement message is received by server 200 within a predetermined time, server 200 would re-send the data packet.

In step 405, client 220 sets itself to receive using the communication protocol for guaranteed reception and signals the server 200 that it is ready to receive data packets. In step 406, server 200 sends all of the high priority data to client 220. In step 407, for our example the client receives the high priority data. The previously described communication protocol for guaranteed delivery ensures that the client 220 has received the high priority data error-free from the server 200. In step 408, client 220 stores the high priority data. Note, because the HP partition (HP1–HPn) generally represents approximately 0.2 percent of all of the data for a selected video segment, it can easily be stored on the disc (e.g., 222) at the client location. In comparison, the LP partition (LP1–LPn) for a typical movie video segment would be too large (typically several gigabytes) to be practical for storage at the client location. Because of the low-cost wideband transmission network 210 available, the LP partition can be readily retransmitted any time that the client wants it.

If the high priority information was in the form of a high priority format or identifier, then in steps 407 and 408 they would be received and stored. Alternatively, in step 408 the high priority format may be utilized to generate the high priority partition information which would then be stored.

In step 409, the server 200 sets the communication protocol for non-guaranteed delivery of the low priority data of the requested video segment to the client 220. In accordance with an aspect of the present invention, the system can limit the number of times that the low priority data of the requested video segment can be sent to the client 220. This ability to multiply send the low priority partition 312 to the client 220 enables the client to have a capability to pause or rewind during the reception of a video segment without having to again receive the high priority partition 311.

In step 410, client 220 sets a communication protocol for the non-guaranteed reception of the low priority partition. The client 220 knows to set the non-guaranteed protocol when it receives an end-of-high-priority flag as part of the high priority data reception during step 407.

In step 411, server 200 reads from disc 202 the low priority data partition 312, when format 320 is utilized (or creates the low priority data partition 312 when format 310 or 330 is utilized, as previously described). In step 412, server 200 transmits the low priority data partition 312 in real time to client 220. The packets containing the LP data may include frame numbers, time stamps, sequence numbers enabling resynchronization to the associated HP data at the client decoder 224 in the case of LP packet loss.

In step 413, in our example client 220 reads the high priority partition from memory and, in step 414, sends it to video decoder 224.

Alternatively, if a high priority identifier was stored in step 408, it would be used to access the high priority partition at the client location. If, however, the high priority format information was stored in step 408, then in step 413 it could be used to generate the high priority partition.

In step 415, client 220 receives the low priority data segment in real time from server 200 and sends it in step 416 to video decoder 224. The steps 414 and 416 are coordinated by processor 221 so that the stored high priority partition is interleaved in real time with the received low priority partition sent to video decoder 224. The interleaved data would have the original raw compressed data stream format shown by 310. Video decoder 224 then converts the interleaved data to the display format needed to enable monitor 225 to display the requested video segment.

In step 417, client 220 can request to replay the video segment. If a control command request is made, in step 418, control returns to step 411. A control command request may be the well-known VCR-type request including stop, pause, fast forward, fast backward, replay, etc. The stop command instructs the server 200 to not send any additional low priority data. The pause command performs the stop command function but additionally causes decoder 224 to hold the last frame. The fast forward command causes server 200 to send only MPEG-2 I frames of the low priority partition. The fast backward command causes the server 200 to send the I frames in reverse order. The replay command causes server 200 to re-send only the low priority partition. These capabilities may illustratively be implemented consistent with the "Trick modes" described in section D.12 at page 167 of the previously referenced MPEG-2 draft standard.

If the control command requests a new video segment, step 419, control returns to step 402. If no control command request is made, step 420, then processor 221 clears the previously stored high priority data from memory. In step 421 the procedure ends and control returns to the standby state, step 400.

While the present invention has been described for an encoded video bitstream, it can more generally be used with unencoded video bitstreams.

What has been described is merely illustrative of the application of the principles of the present invention. Other arrangements and methods can be implemented by those skilled in the art without departing from the spirit and scope of the present invention.

We claim:

1. A method of transmitting a video bitstream from a transmitter over a facility to a receiver, the video bitstream including a plurality of high priority segments and associated low priority segments, said method comprising the steps of at the transmitter, first transmitting a high priority partition, including the high priority segments, of the video bitstream over the facility using a first packet delivery mechanism having a first probability of success;

subsequently transmitting, after the completion of transmission of the high priority partition, a low priority partition, including the low priority segments, of the video bitstream over the facility in real time using second packet delivery mechanism having a second probability of success which is substantially lower than that of the first delivery mechanism; and at the receiver, receiving and storing the high priority partition;

receiving the low priority partition; and interleaving each high priority segment, obtained from storage, in real time with the associated received low priority segment to create an interleaved video bitstream.

2. A method of transmitting a video bitstream from a transmitter over a facility to a receiver, the video bitstream including a plurality of high priority segments and associated low priority segments, said method comprising the steps of at the transmitter, first transmitting high priority information, representative of the high priority segments, over the facility using a first packet delivery mechanism having a first probability of success;

subsequently transmitting, after the completion of transmission of the high priority information, a low priority partition, including the low priority segments, of the video bitstream over the facility in real time using a second packet delivery mechanism having a second probability of success which is substantially lower than that of the first delivery mechanism; and at the receiver, receiving the high priority information and using it to generate the high priority segments;

receiving the low priority partition; and interleaving each generated high priority segment in real time with the associated received low priority segment to create an interleaved video bitstream.

3. The method of claim 2 wherein the first packet delivery mechanism provides reliable error-free delivery of packets over the facility and said second packet delivery mechanism uses a less-reliable delivery mechanism.

4. The method of claim 2 including the steps of at the transmitter, receiving a video bitstream having high priority segments interleaved with associated low priority segments; and partitioning the video bitstream into a high priority partition and a low priority partition prior to said first transmitting step.

5. The method of claim 4 further including the steps of at the transmitter, receiving a video bitstream having high priority segments interleaved with associated low priority segments;

storing the video bitstream;

generating a table identifying the association between high priority segments and low priority segments in the video bitstream; and creating the high priority partition using the table to access the high priority segments from the stored video bitstream prior to said first transmitting step.

6. The method of claim 5 wherein the table identifies the storage location of the high priority segments.

7. The method of claim 6 wherein a time stamp is used to identify the association between the high priority segments and the low priority segments.

8. The method of claim 6 wherein a frame identifier is used to identify the association between the high priority segments and the low priority segments.

9. The method of claim 8 further including the step of at the transmitter, receiving a video bitstream having a high priority partition, including the high priority segments, and a low priority partition, including the low priority segments, prior to said first transmitting step.

10. The method of claim 2 further including the steps of at the receiver, requesting a delivery of a bitstream of an identified video segment; and at the transmitter, receiving the video segment request and in response thereto accessing the bitstream for the identified video segment prior to the transmitting step.

11. The method of claim 2 further including the steps of at the receiver, sending a control command request to the transmitter; and at the transmitter, decoding and controlling the transmission of said low priority partition to the receiver in response to a received control command request.

12. The method of claim 11 wherein the control command request is selected from a group of commands including at least stop, pause, fast forward, and replay commands.

13. The method of claim 2 further including the steps of at the receiver, sending a replay command to the transmitter requesting a replay transmission of the low priority partition;

at the transmitter, in response to the replay command, sending a replay transmission of the low priority partition to the receiver; and at the receiver, interleaving in real time a high priority segment associated with each received low priority segment of the replay transmission received from the transmitter.

14. The method of claim 2 wherein the high priority information is a high priority partition including the high priority segments and wherein at the receiver the high priority partition is stored prior to receiving the low priority partition.

15. The method of claim 2 wherein the high priority information includes standard format information used by a receiver to generate the high priority segments.

16. The method of claim 2 wherein the high priority information is used to identify high priority segments previously stored at the receiver.

17. A method of communicating a video bitstream, including interleaved high priority and associated low priority segments, over a packet network, comprising the steps of partitioning segments of a received video bitstream into high priority and low priority partitions;

transmitting the high priority partition first over the network in real time using a reliable delivery mechanism of the network;

subsequently transmitting, after the completion of transmission of the high priority partition, the low priority partition second over the network using a less reliable delivery mechanism of the network;

recovering and storing at a receiver location the high priority partition;

receiving the low priority partition at the receiver location; and interleaving segments of the stored high priority partition in real time with associated segments of the received low priority partition to recreate the video bitstream.

18. Apparatus for transmitting a video bitstream from a transmitter over a facility to a receiver, the video bitstream including a plurality of high priority segments and associated low priority segments, said apparatus comprising at the transmitter, first means for transmitting a high priority partition, including the high priority segments, of the video bitstream over the facility using a first packet delivery mechanism having a first probability of success;

second means for transmitting, after the completion of transmission of the high priority partition, a low priority partition, including the low priority segments, of the video bitstream over the facility in real time using a second packet delivery mechanism having a second probability of success which is substantially lower than that of the first delivery mechanism; and at the receiver, means for receiving the high priority and low priority partitions;

means for storing the high priority partition; and means for interleaving a high priority segment, obtained from storage, in real time with the associated low priority segment to create an interleaved video bitstream.

19. Apparatus for transmitting a video bitstream over a facility to a receiver, the video bitstream including a plurality of high priority segments and associated low priority segments, said apparatus comprising first means for transmitting a high priority partition, including the high priority segments, of the video bitstream, over the facility using a first packet delivery mechanism having a first probability of success; and second means for transmitting, after the completion of transmission of the high priority partition, a low priority partition, including the low priority segments, of the video bitstream over the facility in real time using a second probability of success which is substantially lower than that of the first delivery mechanism.

20. Apparatus for receiving a video bitstream over a facility from a transmitter, the video bitstream including a plurality of high priority segments and associated low priority segments, said apparatus comprising means for first receiving the high priority partition and, after the completed reception of the high priority partition, receiving the low priority partition;

means for storing the high priority partition; and means for interleaving a high priority segment, obtained from storage, in real time with the associated low priority segment to create an interleaved video bitstream.

21. A method of transmitting a video bitstream from a transmitter over a facility to a receiver, the video bitstream including a plurality of high priority segments and associated low priority segments, said method comprising the steps of at the transmitter, first transmitting standard format information, instead of the high priority segments of the video bitstream, over the facility using a first packet delivery mechanism having a first probability of success, the standard format information being used to generate high priority segments at the receiver;

subsequently transmitting, after the completion of transmission of the standard format information, a low priority partition, including the low priority segments, of the video bitstream over the facility in real time using a second packet delivery mechanism having a second probability of success which is substantially lower than that of the first delivery mechanism; and at the receiver, receiving the standard format information and using it to generate the high priority segments;

receiving the low priority partition; and interleaving each generated high priority segment in real time with the associated received low priority segment to create an interleaved video bitstream.

22. Apparatus for transmitting a video bitstream from a transmitter over a facility to a receiver, the video bitstream including a plurality of high priority segments and associated low priority segments, said apparatus comprising at the transmitter, first means for transmitting high priority information, representative of the high priority segments, over the facility using a first packet delivery mechanism having a first probability of success;

second means for transmitting, after the completion of transmission of the high priority information, a low priority partition, including the low priority segments, of the video bitstream over the facility in real time using a second packet delivery mechanism having a second probability of success which is substantially lower than that of the first delivery mechanism; and at the receiver, means for receiving the high priority information and using it to generate the high priority segments;

means for receiving the low priority partition; and means for interleaving each generated high priority segment in real time with the associated received low priority segment to create an interleaved video bitstream.

23. The apparatus of claim 22 wherein the high priority information includes standard format information used by a receiver to generate the high priority segments.

24. The apparatus of claim 22 wherein the high priority information is used to identify high priority segments previously stored at the receiver.

25. A method of transmitting a video bitstream over a facility to a receiver, the video bitstream including a plurality of high priority segments and associated low priority segments, said method comprising the steps of first transmitting high priority information, representative of the high priority segments, over the facility using a first packet delivery mechanism having a first probability of success, the high priority information being used to generate a high priority partition at the receiver; and second transmitting, after the completion of transmission of the high priority information, a low priority partition, including the low priority segments, of the video bitstream over the facility in real time using second packet delivery mechanism having a second probability of success which is substantially lower than that of the first delivery mechanism.

26. A method of receiving a video bitstream over a facility from a transmitter, the video bitstream including a plurality of high priority segments and associated low priority segments, said method comprising the steps of receiving the high priority information and using it to generate the high priority segments;

receiving, after the completion of reception of the high priority information, the low priority segments; and interleaving each generated high priority segment in real time with the associated low priority segment to create an interleaved video bitstream.

27. Apparatus for transmitting a video bitstream over a facility to a receiver, the video bitstream including a plurality of high priority segments and associated low priority segments, said apparatus comprising first means for transmitting high priority information, representative of the high priority segments, over the facility using a first packet delivery mechanism having a first probability of success, the high priority information being used to generate the high priority segments at the receiver; and second means for transmitting, after the completion of transmission of the high priority information, a low priority partition, including the low priority segments, of the video bitstream over the facility in real time using a second packet delivery mechanism having a second probability of success which is substantially lower than that of the first delivery mechanism.

28. Apparatus for receiving a video bitstream over a facility from a transmitter, the video bitstream including a plurality of high priority segments and associated low priority segments, said apparatus comprising means for receiving the high priority information and using it to generate the high priority segments;

means for receiving, after the completion of reception of the high priority information, the low priority segments; and means for interleaving each generated high priority segment in real time with the associated low priority segment to create an interleaved video bitstream.

* * * * *